United States Patent [19]

Michael

[11] 4,005,605
[45] Feb. 1, 1977

[54] REMOTE READING INFRARED THERMOMETER

[75] Inventor: Donald S. Michael, Ridgewood, N.J.

[73] Assignee: Mikron Instrument Company, Inc., Ridgewood, N.J.

[22] Filed: July 22, 1974

[21] Appl. No.: 490,883

[52] U.S. Cl. .............................. 73/355 R
[51] Int. Cl.² .......................... G01J 5/00
[58] Field of Search .......... 73/1 F, 355 R, 355 EM; 250/347, 352, 353

[56] References Cited

UNITED STATES PATENTS

| | | | |
|---|---|---|---|
| 2,761,072 | 8/1956 | Wormser | 73/355 R |
| 3,091,693 | 5/1963 | Rudomanski et al. | 73/355 R X |
| 3,272,013 | 9/1966 | Astheimer | 73/355 R |
| 3,392,282 | 7/1968 | Astheimer | 250/351 |
| 3,761,713 | 9/1973 | Merrill | 73/355 R X |
| 3,916,690 | 11/1975 | Brandli | 73/355 EM |
| 3,924,469 | 12/1975 | Brandli et al. | 73/355 EM |

Primary Examiner—Jerry W. Myracle
Attorney, Agent, or Firm—Robert C. Podwil

[57] ABSTRACT

A radiation detector senses ambient radiation within the cavity of an instrument, and then radiation from a target object, the sensed radiation from within the cavity following substantially the same optical path within the instrument as the radiation from the target object, thus minimizing error due to internal cavity temperature and other disturbances during measurement of radiation from the target object.

9 Claims, 5 Drawing Figures

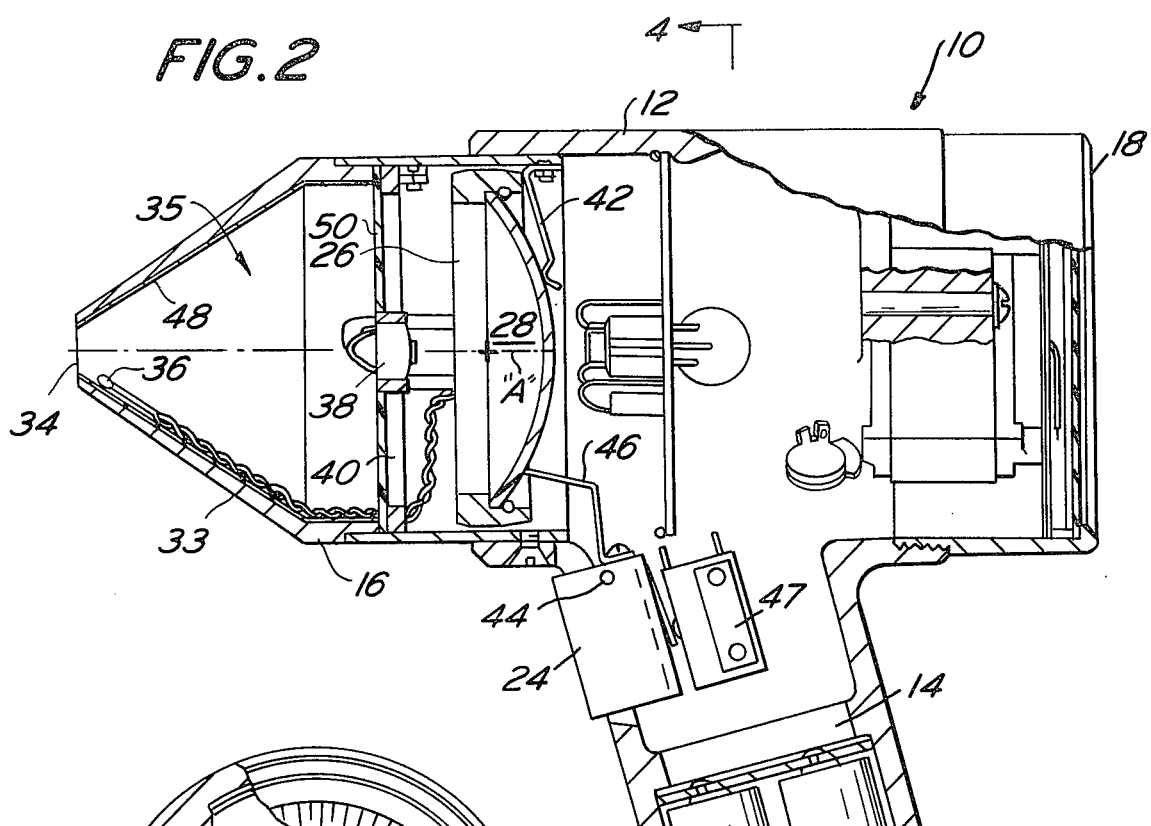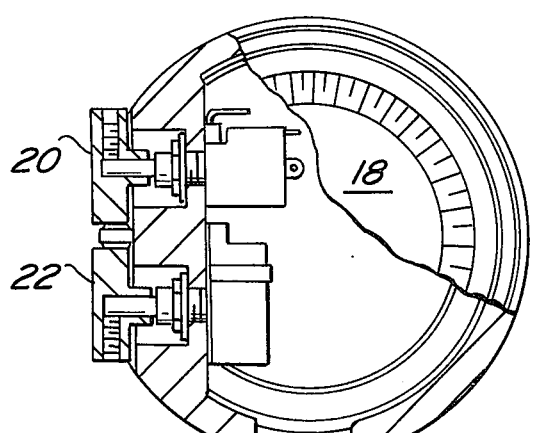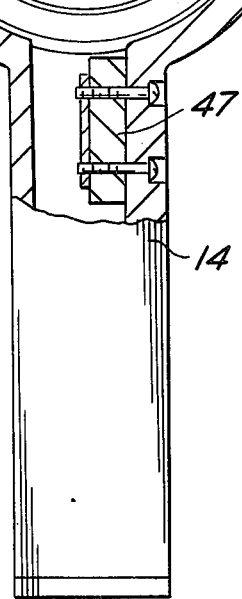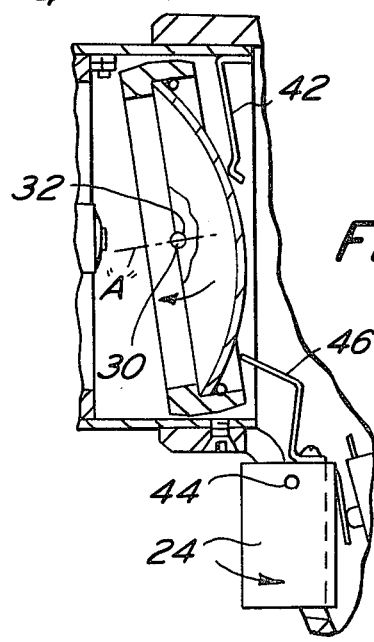

REMOTE READING INFRARED THERMOMETER

This invention relates to a remote reading infrared thermometer, and more particularly, to apparatus for making remote temperature measurements by sensing and measuring radiation emitted by a target object.

Numerous devices for making remote temperature measurements have been proposed. Among them are those described in the following U.S. Pat. Nos. 2,798,962, issued to Wormser; 2,920,485, issued to Derganc; 3,303,340, issued to Hewett et al; 3,444,739, issued to Treharne; and 3,463,006, issued to Paddock et al.

In accordance with one well-known and widely used concept, as exemplified by the teachings of the above-mentioned U.S. Pat. Nos. 2,798,962, 3,920,485 and 2,927,464, the instrument includes a "reference" radiation source of constant known temperature; a detector (which may include one or more sensing elements) capable of sensing emissions from the reference source and from a target object of unknown temperature; and a mechanical or electronic "chopper" through which radiation from the target object passes intermittently to the detector. The output signal of the detector in such an instrument is indicative of a comparison between the radiation sensed from the target object and that of the reference source. Typically, the output signal is subjected to A. C. amplification, then demodulated, and then processed for readout or display by meter or otherwise. Instruments of this general type have the advantage of avoiding error due to D. C. drift in the detector and amplifier, but are limited in their application due to the size and complexity of their mechanical components.

It is an object of this invention to provide a form of apparatus which approximates in its operation the operative steps which occur in apparatus of the above-mentioned type, but which eliminates the need for a mechanical chopper and takes advantage of the inherent simplicity and reliability of D. C. amplification.

Another aspect of certain known forms of remote reading infrared thermometers is the use of flags or shutters to selectively admit to the cavity of an instrument (or to a sensor within the cavity), radiation from a target object, the radiation so admitted being sensed and compared electronically to conditions sensed with the shutter closed. U.S. Pat. Nos. 3,303,340 and 3,463,006 are illustrative of instruments of this general type. It has been found, however, that flags or shutters are themselves sources of thermal disturbance, and hence, inaccuracy in measurement. Thus, it is another object of this invention to provide apparatus in which the use of mechanical flags or shutters is avoided.

The instruments disclosed in U.S. Pat. Nos. 3,303,340 and 3,444,739 are illustrative of prior art apparatus in which the need for choppers or self-contained known reference sources is avoided. These instruments are designed to sense internal ambient conditions, and to compare the sensed ambient conditions with a signal produced by emissions from a target body of unknown temperature. Operation of such apparatus to produce an accurate quantitative readout requires taking of a preliminary reading from a reference source of known temperature (such as a mercury thermometer) to establish a "zero" reference. This invention provides a form of apparatus in which the need for the taking of a separate zero or calibration reading is avoided.

The present invention is directed, therefore, to apparatus for making remote temperature measurements wherein both mechanical chopping and the use of mechanical shutters is eliminated and which may be embodied in a self-contained hand-holdable instrument, capable of providing accurate remote temperature readings without the need for manual "zeroing" or calibration. It should be understood that the concept of providing for automatic zeroing of apparatus of the present type is not per se novel, but an application of the principles of the present invention in conjunction with automatic electronic zeroing yields a simple and efficient instrument in which inaccuracies due to ambient conditions within the cavity of the instrument are minimized or substantially eliminated.

Other objects will appear hereinafter.

The foregoing and other objects of this invention are realized, in presently preferred forms of the invention, by apparatus having a housing defining a cavity, an aperture in the cavity for admitting to the interior of the cavity radiation from a target object, a detector within the cavity for sensing incident radiation, a selectively shiftable optical element within the cavity for directing radiation from within the cavity or from a target object to the detector, and electronic circuitory for first measuring ambient radiation within the cavity, comparing the ambient radiation with the sensed radiation from a target object to cancel out internal cavity influences, amplifying the resulting signal, adding to the signal a compensating signal indicative of ambient temperature, and producing a readout.

For the purpose of illustrating the invention, there is shown in the drawings a form of the invention which is presently preferred, it being understood, however, that this invention is not limited to the precise arrangements and instrumentalities shown.

FIG. 2 is a longitudinal cross-sectional view of the apparatus shown in FIG. 1, taken along the line 2—2 in FIG. 1.

FIG. 3 is a partial cross-sectional view, taken along a line similar to that of FIG. 2, showing a portion of the instrument in another operative condition.

FIG. 4 is a transverse cross-sectional view, taken along the line 4—4 in FIG. 2.

Figure 1:
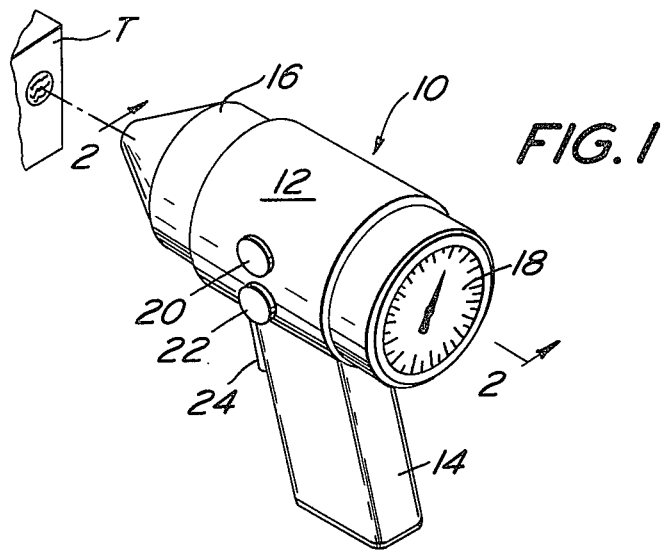
FIG. 1 is a perspective view of an instrument in accordance with the present invention.

Referring now to the drawings in detail, wherein like reference numerals indicate like elements, there is seen in FIG. 1 an infrared thermometer or instrument designated generally by the reference numeral 10. The instrument 10 includes a housing 12 to which is affixed a handle portion 14. The housing 12 in the illustrated form of the instrument 10 is made in three pieces for ease of assembly and disassembly, but other equivalent forms could readily be used. Associated with the housing 12, and seen in FIG. 1, are a nose portion 16, which will be described in detail below, and a meter 18, providing a visual readout. Suitable controls 20 and 22, as well as an off-on switch, not shown in FIG. 1, are also associated with the housing 12. Inset within the handle portion 14 is a trigger means 24, which will also be described in detail below.

Referring now to FIGS. 2 and 3, mounted within the housing 12 by means of a gimbal ring 26 is a mirror 28. The gimbal ring 26 is pivotably supported with respect to the housing 12 by oppositely disposed trunnions 30, one of which is seen in FIG. 3. The trunnions 30 are supported in complementary bearing surfaces 32 associated with the interior wall of housing 12, and permit pivoting of the gimbal ring 26 and mirror 28 between the respective positions shown in FIGS. 2 and 3.

In FIG. 2, the gimbal ring 26 and mirror 28 are seen in a position in which the optical axis A of the mirror 28 is in general alignment with the longitudinal axis of the housing 12.

The nose portion 16 is affixed to a front portion of the housing 12 and includes a generally conical section 33, the vertex of which is truncated to form an opening 34. When the gimbal ring 26 and mirror 28 are in the position shown in FIG. 2, the optical axis A of the mirror 28 is directed toward the opening 34.

The housing 12 and nose portion 16 define within their hollow interior, a cavity, which is designated generally by the reference numeral 35.

Mounted within the conical portion 33 of the nose portion 16 is a "bead" type thermistor 36, which serves as a sensor for an ambient temperature compensator. Referring to FIG. 3, the gimbal ring 26 and mirror 28 are seen in a canted position in which the optical axis A of the mirror 28 is directed toward the thermistor 36, for a purpose which will be explained below.

Referring again to FIG. 2, mounted within the housing 12 in a position aligned with the longitudinal axis of the housing 12 and with the optical axis A of the mirror 28 when the gimbal ring 26 and mirror 28 are in the position shown in FIG. 2, is a radiation detector 38. The detector 38 is supported within the housing 12 by means of a spider 40.

The manner in which the gimbal ring 26 and mirror 28 are caused to pivot about the trunnions 30 between the respective positions shown in FIGS. 2 and 3 is in a presently preferred form of the invention, as follows:

With reference to FIGS. 2 and 3, biasing means, in the form of a leaf spring 42, are coupled to the gimbal ring 26 and mirror 28 to bias them to the canted position shown in FIG. 3. When it is desired to take a measurement, application by an operator of pressure to the trigger means 24 causes the trigger means to rotate from the position in which it appears in FIG. 3, about a pivot 44, to the position shown in FIG. 2. When the trigger means 24 is so pivoted, an actuator element or finger 46 affixed to the trigger means 24 causes the gimbal ring 26 and mirror 28 to pivot against the force of the biasing means 42, to the position shown in FIG. 2. Actuation of the trigger means 24 is also effective to operate a switch 47, disposed adjacent the trigger means 24, the purpose of which will be explained below.

Other equivalent linkages or mechanisms may be used to position the gimbal ring 26 and mirror 28.

With the gimbal ring 26 and mirror 28 in the position shown in FIG. 2, radiation entering the cavity 35 as well as ambient radiation originating within the cavity 35 is directed by the mirror 28 to the detector 38.

The size of the opening 34 is so proportioned with respect to the internal diameter of the cavity that stray infrared radiation entering or leaving the cavity is negligible as compared to the signal imposed on the detector 38. A ratio of about one to ten has been found suitable. As a further check against stray radiation, the interior of the nose portion 16 and the remainder of the cavity may be coated with a layer 48 of flat black paint or other infrared energy-absorbing material. A sheet 50 of infrared-transparent material may be provided within the nose portion 16 to protect the detector 38 and mirror 28 and the internal mechanisms of the thermometer 10 from foreign matter and thermal disturbance.

Figure 5:
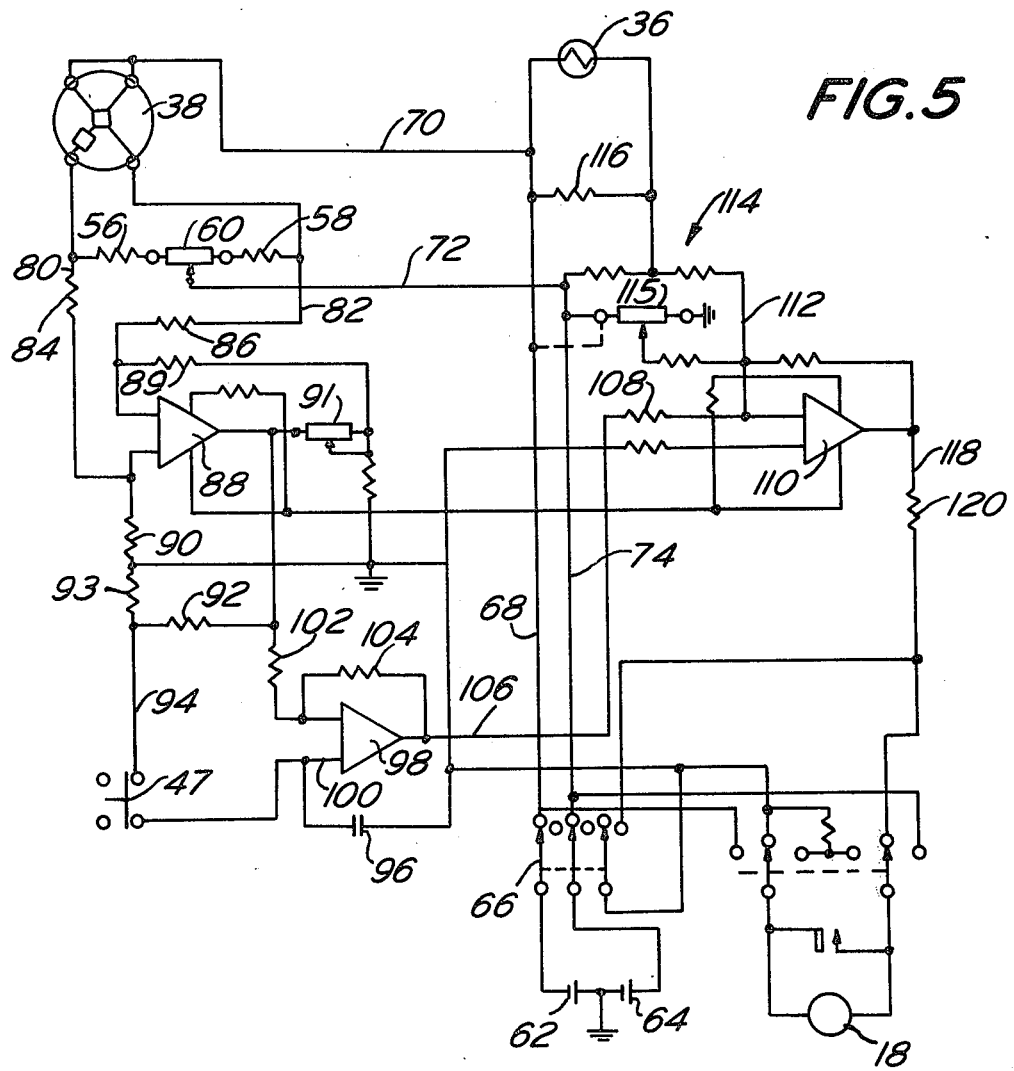
FIG. 5 is a schematic circuit diagram of a presently preferred means for carrying out the present invention.

Referring now to FIG. 5, there is illustrated a presently preferred circuit for detecting and measuring infrared radiation, and for producing a signal and readout indicative of the temperature of a target object. The illustrated circuit is depicted as utilizing thermistor bolometer type detection, but other well-known detectors, such as thermopile, pyroelectric, silicon and the like may be used.

Active and passive elements 52 and 54 of the thermistor bolometer are contained in the above-mentioned detector 38 and constitute two arms of a Wheatstone bridge. Resistors 56 and 58 and a potentiometer 60 are the remaining two arms of the bridge. The potentiometer 60 permits initial balancing of the bridge. Power for the bridge is provided by batteries 62 and 64 (which may be conveniently housed in the handle portion 14) through a multiple pole "off-on" switch 66 and conductors 68, 70, 72 and 74. The output of the bridge is connected by conductors 80 and 82, through input resistors 84 and 86 to a differential preamplifier 88. The differential preamplifier 88 is provided with suitable control and power circuitry, including feedback resistors 89 and 90, gain control potentiometer 91 and current biasing resistor 92, the function of which is apparent to those skilled in the art need not be described in detail.

The temperature of the thermistor 36 ordinarily closely approximates the ambient temperature within the cavity 35. Thus, with the gimbal ring 26 and mirror 28 in the position shown in FIG. 3, radiation indicative of in-cavity conditions is incident upon the detector 38. In reaching the detector 38, such radiation follows an optical path by way of the mirror 28 not substantially different from the optical path followed by incident radiation from a target object when the mirror 28 is in the position shown in FIG. 2.

Sensed in-cavity radiation as represented by the output of bridge, is amplified by a differential preamplifier 88. The voltage output, therefore, of the preamplifier 88 with the instrument in the configuration shown in FIG. 3 is proportional to total in-cavity radiation plus any short or long term drift in the sensor 38 and preamplifier 88. With the switch 66 in a closed or "on" position, the trigger means 24 not actuated, and the gimbal ring 26 and mirror 28 therefore positioned as shown in FIG. 3, the instrument 10 may be said to be in a zeroing mode. With the device so configured, the output of the preamplifier 88 is impressed upon a divider network comprising resistors 92 and 93, and is connected through a conductor 94 and the closed switch 47 to a capacitor 96.

The output signal of the differential preamplifier 88 is of sufficient strength that such additional amplification as is required for processing of the signal does not introduce any additional significant error due to drift.

The reference numeral 98 in FIG. 5 denotes a FET input differential operational amplifier, with an input bias current of less than 1 p.a. The capacitor 96 is connected to the non-inverting input 100 of the amplifier 98.

The resistance of the previously mentioned resistor 92 is matched to within 0.1% of the resistance of a resistor 102 associated with the inverting input of the amplifier 98. Similarly, the resistance of resistor 93 is matched to within 0.1% of the resistance of resistor 104. Thus, with the switch 47 closed, potential across the resistor 104 will equal the potential across the capacitor 96. The difference between potentials sensed at the inverting and non-inverting inputs of the amplifier 98 will be zero, and the output of the amplifier 98 also zero.

Actuation of the trigger means 24 to open the switch 47 and move the gimbal ring 26 and mirror 28 to the position shown in FIG. 2 may be said to place the instrument 10 in an "operative" or measuring mode.

Opening of the switch 47 disconnects the capacitor 96 from the output of the preamplifier 88, but because the capacitor 96 remains connected to the non-inverting input of the amplifier 98, the amplifier 98 "remembers" that output voltage.

When the gimbal ring 26 and mirror 28 assume the configuration shown in FIG. 2 in the manner described above, radiation from a target object (designated by the letter T in FIG. 1) is focused on the detector 38 so that the detector 38 senses both in-cavity radiation and the radiation from the target object. That radiation, it will be appreciated, will differ significantly from the in-cavity radiation previously sensed, and it will cause a different potential to appear at the output of preamplifier 88 and at the inverting input of amplifier 98. Amplifier 98 will now produce an output voltage proportional to the total energy sensed from the target T, minus the in-cavity radiation previously sensed and stored in the capacitor 96. Any significant in-cavity effects as well as drift in the sensor 22 and preamplifier 88 will be substantially cancelled.

The output of amplifier 98 is applied, through conductor 106 and input resistor 108 to a summing amplifier 110. Also applied to the input the summing amplifier 110 is a signal provided through the conductor 112 as the output of an ambient temperature compensation circuit, designated generally by the reference numeral 114, and including the above-mentioned ambient temperature compensator thermistor 36. It will be appreciated that variation in the thermistor 36 will affect the potential across the network comprising the termistor 36 and the fixed resistor 116 in parallel with it. A potentiometer 115 is provided to permit setting of an initial temperature reading (ambient temperature) on the matter 18.

The output of the summing amplifier 110 may be impressed, through conductor 118 and resistor 120 upon an indicator, such as the above-mentioned meter 18 to provide a readout. Since the output of the summing amplifier 110 is proportional to sensed target radiation, compensated for ambient temperature, the output may be translated directly into a reading in ° F or ° C indicative of temperature.

The present invention has been found suitable for relatively low temperature measurements, in the range of from −20° to 60° C, and is particularly useful, for example in veterinary medicine.

The present invention may be embodied in other specific forms without departing from its spirit or essential attributes, and accordingly, reference should be made to the appended claims, rather than to the foregoing specification, as indicating the scope of the invention.

I claim:

1. In a remote reading infrared theremometer having a housing defining a cavity, an aperture in said cavity for admitting to said cavity radiation emanating from a target object, radiation detector means disposed in said cavity, and radiation directing means disposed in said cavity for selectively directing toward said detector means ambient radiation from within said cavity and then radiation emanating from a target object of unknown temperature outside said cavity, and manually operable means coupled to said radiation directing means for moving said radiation directing means from a first position wherein said radiation directing means directs toward said detector means ambient radiation from within said cavity and a second position wherein said radiation directing means directs toward said detector means radiation emanating from said target object, said radiation directing means being a mirror of concave cross-section, and having its optical axis aligned with said aperture when in said second position.

2. In a remote reading infrared thermometer in accordance with claim 1, said detector being disposed at the focal point of said mirror when said mirror is in said second position.

3. In a remote reading infrared thermometer having a housing defining a cavity, an aperture in said cavity for admitting to said cavity radiation emanating from a target object, radiation detector means disposed in said cavity, and radiation directing means disposed in said cavity for selectively directing toward said detector means ambient radiation from within said cavity and then radiation emanating from a target object of unknown temperature outside said cavity, said radiation directing means being a mirror pivotably mounted within said cavity and juxtaposed to said detector means, said mirror being pivotable between a first position wherein said mirror directs toward said detector means ambient radiation from within said cavity and a second position wherein said mirror directs toward said detector means radiation emanating from said target object, and ambient temperature sensing means disposed in said cavity, said mirror being directed toward said ambient temperature sensing means when said mirror is in said first position.

4. In a remote reading infrared thermometer in accordance with claim 3, said mirror being of concave cross-section and having its optical axis aligned with said opening and said detector when in said second position and having its optical axis aligned with ambient temperature sensing means when in said first position.

5. In a remote reading infrared thermometer in accordance with claim 4, a tapered nose portion defining a part of said cavity, said aperture being disposed at a vertex of said nose portion, and said aperture being generally circular.

6. In a remote reading infrared thermometer in accordance with claim 3, biasing means coupled to said mirror for biasing said mirror to said first position, and trigger means coupled to said mirror for selectively moving said mirror to said second position.

7. In a remote reading infrared thermometer in accordance with claim 3, means electrically coupled to said detector for producing a first electrical signal generally representative of in-cavity radiation when said mirror is in said first position and a second electrical signal generally representative of radiation eminating from a target object when said mirror is in said second position, means for comparing said first and second signals when said mirror is in said second position so as to produce a third electrical signal representative of the difference between said first and second signals, means electrically coupled to said ambient temperature sensing means for producing a fourth electrical signal representative of in-cavity ambient temperature, and summing means for adding said fourth signal to said third signal to produce an output signal compensated for in-cavity ambient temperature.

8. In a remote reading infrared thermometer in accordance with claim 7, biasing means coupled to said mirror for biasing said mirror to said first position, and trigger means coupled to said mirror for selectively moving said mirror to said second position.

9. In a remote reading infrared thermometer in accordance with claim 8, a tapered nose portion defining a part of said cavity, said aperture being disposed at a vertex of said nose portion, and said aperture being generally circular.

* * * * *